US012556038B2

United States Patent
Mahlein et al.

(10) Patent No.: US 12,556,038 B2
(45) Date of Patent: Feb. 17, 2026

(54) SYSTEM FOR TRANSMITTING ELECTRICAL ENERGY

(71) Applicant: SEW-EURODRIVE GMBH & CO. KG, Bruchsal (DE)

(72) Inventors: Jochen Mahlein, Karlsruhe (DE); Andreas Böser, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 560 days.

(21) Appl. No.: 18/033,458

(22) PCT Filed: Oct. 6, 2021

(86) PCT No.: PCT/EP2021/077560
§ 371 (c)(1),
(2) Date: Apr. 24, 2023

(87) PCT Pub. No.: WO2022/089902
PCT Pub. Date: May 5, 2022

(65) Prior Publication Data
US 2023/0411996 A1  Dec. 21, 2023

(30) Foreign Application Priority Data
Oct. 26, 2020 (DE) .......................... 102020006553.8

(51) Int. Cl.
*H02J 50/10* (2016.01)
*B60L 13/00* (2006.01)
(Continued)

(52) U.S. Cl.
CPC ............ *H02J 50/10* (2016.02); *B60L 13/003* (2013.01); *H01F 38/14* (2013.01); *H02G 3/283* (2013.01);
(Continued)

(58) Field of Classification Search
CPC .......... H02J 50/005; H02J 50/10; H02J 50/90; H02G 3/383; H02G 3/283; H01F 38/14; B60L 13/003; Y02T 10/7072
See application file for complete search history.

(56) References Cited

U.S. PATENT DOCUMENTS

| 10,277,056 B2 * | 4/2019 | Ritter ..................... H01F 38/14 |
| 2004/0051628 A1 | 3/2004 | Uhl |

(Continued)

FOREIGN PATENT DOCUMENTS

| DE | 1100747 B | 3/1961 |
| DE | 102006013004 A1 | 1/2007 |

(Continued)

OTHER PUBLICATIONS

International Search Report issued in corresponding International Application No. PCT/EP2021/077560 dated Jan. 14, 2022, pp. 1-2, English Translation.

Primary Examiner — Cheng Lin
(74) Attorney, Agent, or Firm — Carter, DeLuca & Farrell LLP (57) ABSTRACT

A system for transmitting electrical energy from an energy source to a consumer, e.g., for contactlessly transmitting energy to a mobile consumer, includes a first line conductor and a second line conductor. Each line conductor has, in a respective axial direction, an at least approximately rectangular cross-section, the long sides of which are longer than the broad sides. The axial directions of the line conductors extend at a right angle with respect to a vertical direction. The first and second line conductors intersect in an intersection region in which a holding device is arranged, and are arranged outside the holding device such that the long sides of the line conductor cross-sections are parallel to the vertical direction. The first and second line conductors are arranged in a central region of the holding device such that (Continued)

the long sides of the line conductor cross-sections are oriented at a right angle with respect to the vertical direction.

16 Claims, 6 Drawing Sheets

(51) Int. Cl.
    *H01F 38/14* (2006.01)
    *H02G 3/38* (2006.01)
    *H02J 50/00* (2016.01)
    *H02J 50/90* (2016.01)

(52) U.S. Cl.
    CPC ........... *H02G 3/383* (2013.01); *H02J 50/005* (2020.01); *H02J 50/90* (2016.02); *Y02T 10/7072* (2013.01)

(56) References Cited

U.S. PATENT DOCUMENTS

| | | | | |
|---|---|---|---|---|
| 2006/0084310 | A1* | 4/2006 | Kondas | H01R 25/162 |
| | | | | 439/215 |
| 2014/0132210 | A1* | 5/2014 | Partovi | H02J 50/12 |
| | | | | 320/108 |
| 2015/0364248 | A1 | 12/2015 | Groves | |

FOREIGN PATENT DOCUMENTS

| | | | | |
|---|---|---|---|---|
| DE | 102004055154 B4 | 10/2007 | | |
| DE | 102006025458 A1 | 12/2007 | | |
| DE | 102017012004 A1 * | 7/2018 | ............. | H02J 50/10 |
| DE | 10053373 B4 | 10/2019 | | |
| DE | 102006025458 B4 * | 6/2020 | ............. | H02J 50/70 |
| EP | 3425649 A1 * | 1/2019 | ........... | H01F 27/263 |
| EP | 3438996 A1 * | 2/2019 | ............. | H02J 50/10 |
| WO | 2003061072 A2 | 7/2003 | | |
| WO | WO-03061072 A2 * | 7/2003 | ........... | H01R 13/506 |
| WO | WO-2012150293 A1 * | 11/2012 | ............ | H02J 7/0042 |

* cited by examiner

SYSTEM FOR TRANSMITTING ELECTRICAL ENERGY

FIELD OF THE INVENTION

The present invention relates to a system for transmitting electrical energy, e.g., from at least one energy source to at least one consumer, e.g., for contactlessly transmitting energy to a mobile consumer. For example, the system includes first and second line conductors, in which the line conductors each have, as seen in a respective axial direction, an at least approximately rectangular cross-section, in which the long sides of the cross-section of the line conductors are longer than the broad sides of the cross-section of the line conductors, and the line conductors are arranged such that the axial directions of the line conductors extend at a right angle with respect to a vertical direction.

BACKGROUND INFORMATION

A system for contactless energy transmission is described in German Patent Document No. 100 53 373. The system includes a feed which feeds a medium-frequency alternating current into an elongated primary conductor. Mobile consumers are movable along the primary conductor and each have a coil which is inductively coupled to the primary conductor. This inductive coupling allows energy to be transferred from the primary conductor to the consumer.

A system for contactless energy transmission is also described in German Patent Document No. 10 2006 013 004, which includes a feeder which feeds a medium-frequency alternating current into an elongated primary conductor.

A system for contactless energy transmission is described in German Patent Document No. 10 2004 055 154. The system includes a power source connected to an elongated primary conductor. A mobile consumer movable along the primary conductor has a transmitter head. The transmitter head has a winding that is inductively coupled to the primary conductor. This inductive coupling allows energy to be transferred from the primary conductor to the transmitter head of the consumer.

A system for contactless energy transmission with a primary conductor system and a device with a transmitter head arranged movably along it are also described in German Patent Document No. 10 2006 025 458.

A system for inductive contactless energy transmission is also described in U.S. Patent Application Publication No. 2015/0364248.

A coupling device for inductive energy transmission to a load is described in European Patent Document No. 3 425 649.

An arrangement for attaching a line wire in a line channel with a fuse body is described in German Patent Document No. 110 07 47.

Certain systems for the transmission of electrical energy are used, e.g., in industrial plants. In this context, the line conductors, which generate a magnetic field, are, e.g., arranged in a floor. For this purpose, cut-outs are sawn or milled into the floor along the path, and the rectangular line conductors are inserted into the cut-outs. The line conductors are arranged in one plane, directly under a surface of the floor. It is problematic to implement intersecting points of several line conductors.

SUMMARY

Example embodiments of the present invention provide a system for the transmission of electrical energy.

According to an example embodiment of the present invention for transmitting electrical energy from at least one energy source to at least one consumer, e.g., for contactlessly transmitting energy to a mobile consumer, includes a first line conductor and a second line conductor. Each line conductor includes, as seen in a respective axial direction, an at least approximately rectangular cross-section. long sides of the cross section of the line conductors are longer than the broad sides of the cross-section of the line conductors, and the line conductors are arranged such that the axial directions of the line conductors extend at a right angle with respect to a vertical direction. The first line conductor and the second line conductor intersect in an intersection region, in which a holding device is arranged. The first line conductor and the second line conductor are arranged outside the holding device such that the long sides of the cross-sections of the line conductors are oriented parallel to the vertical direction. The first line conductor and the second line conductor are arranged in a central region of the holding device such that the long sides of the cross-sections of the line conductors are oriented at a right angle with respect to the vertical direction.

The first line conductor extends in a first axial direction, and the second line conductor extends in a second axial direction. The line conductors are thus rotated 90° in the central region of the holding device relative to their respective orientation in the edge regions of the holding device as well as outside the holding device. Thus, in the central region, an extension of the line conductors in the vertical direction is less than in the edge regions as well as outside the holding device. Thus, an intersection of line conductors is made possible, and no additional space in the vertical direction is required in the intersection region. In addition, the holding device protects the intersection region from mechanical loads, for example, when a vehicle drives over it.

According to example embodiments, the first line conductor and the second line conductor are arranged in a region between an edge region of the holding device and the central region of the holding device such that the long sides of the cross-sections of the line conductors are oriented inclined to the vertical direction and inclined to a respective transverse direction. A first transverse direction extends at a right angle with respect to the first axial direction and at a right angle with respect to the vertical direction. A second transverse direction extends at a right angle with respect to the second axial direction and at a right angle with respect to the vertical direction.

According to example embodiments, the holding device has an upper part and a lower part, and the upper part and the lower part are arranged offset from one another in the vertical direction. The line conductors are held between the upper part and the lower part in a form-fitting manner. The upper part and the lower part are arranged such that the rotation of the line conductors results from pressing the upper part and the lower part together in the vertical direction.

According to example embodiments, the upper part and the lower part are arranged identically. This, for example, simplifies the effort required for producing and storing the holding device.

According to example embodiments, the upper part and the lower part are made of electrically insulating material, e.g., plastic. The holding device thus contains no metallic elements that could influence a magnetic field generated by the line conductors. The upper and lower parts can be produced by injection molding, milling, or additive manufacturing, for example.

According to example embodiments, the upper part and the lower part are detachably connected to one another by at least one screw, which is made of electrically insulating material, e.g., plastic. The holding device thus contains no metallic elements that could influence a magnetic field generated by the line conductors. Other connection techniques are also possible, for example, by detents, e.g., if the upper part and the lower part are produced as injection molded parts.

According to example embodiments, the holding device has an at least approximately circular cross-section, as seen in an axial direction. The holding device can be installed in a floor or in a laying plate and with simple tools. For example, a circular cylindrical hole is made in the floor or in the laying plate with a router, and the holding device is inserted therein.

According to example embodiments, the holding device has a first channel for accommodating the first line conductor and a second channel for accommodating the second line conductor, in which the channels each extend from an edge region of the holding device through the central region of the holding device to a respective at least approximately opposite edge region of the holding device.

According to example embodiments, the first channel extends at least approximately at a right angle with respect to the second channel. This simplifies the geometric configuration of the holding device. Other angles, deviating from a right angle, between the first channel and the second channel are also possible.

According to example embodiments, the channels each have an at least approximately rectangular cross-section, in which the long sides of the cross-section of the channels are longer than the broad sides of the cross-section of the channels. The channels are configured such that in the edge region of the holding device, the long sides of the cross-sections of the channels are oriented parallel to the vertical direction, and such that in the central region of the holding device, the long sides of the cross-sections of the channels are oriented at a right angle with respect to the vertical direction. The cross-section of the channels corresponds to the cross-section of the line conductors.

According to example embodiments, the long sides of the cross-sections of the channels in a region between the edge region of the holding device and the central region of the holding device are oriented inclined to the vertical direction and inclined to a respective transverse direction. Thus, the channels undergo a rotation between the edge region and the central region.

According to example embodiments, in the central region of the holding device, the first channel and the second channel extend offset from one another in the vertical direction. This means that the first line conductor also extends offset from the second line conductor in the vertical direction. A common extension of the line conductors in the vertical direction in the central region thus corresponds to twice the broad side of the line conductors and is less than an extension of the individual line conductors in the vertical direction in the edge regions of the holding device as well as outside the holding device.

According to example embodiments, the holding device has two first channels for accommodating two first line conductors extending in parallel and/or two second channels for accommodating two second line conductors extending in parallel. Thus, two first line conductors, for example, as a feed conductor and a return conductor, and two second line conductors, for example, as a feed conductor and a return conductor, can be provided in the system.

Further features and aspects of example embodiments of the present invention are explained in more detail below with reference to the appended schematic Figures.

DETAILED DESCRIPTION

Figure 1:
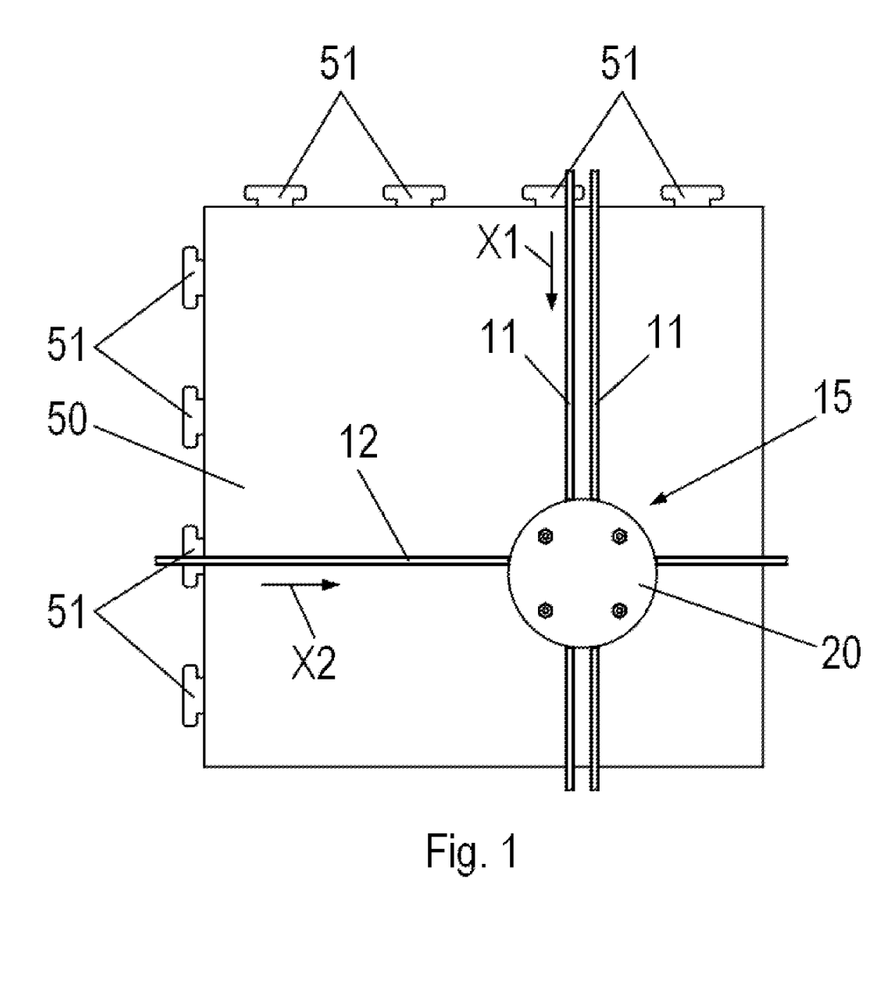
FIG. 1 is a top view of a part of a system for the transmission of electrical energy.

FIG. 1 is a top view of a part of a system for the transmission of electrical energy. The part of the system for transmitting electrical energy includes a laying plate 50, which is made of an electrically insulating material, e.g., plastic. The laying plate 50 has a plurality of latching lugs 51, which are used to secure the laying plate 50 to other laying plates 50 of the system for transmitting electrical power. The laying plates 50 are arranged on a level floor.

The system for transmitting electrical power includes two first line conductors 11 and one second line conductor 12. The first line conductors 11 extend parallel to one another in a first axial direction X1 and at a right angle with respect to the second line conductor 12, which extends in a second axial direction X2. In an intersection region 15, the first line conductor 11 and the second line conductor 12 intersect. A holding device 20 is arranged in the intersection region 15, by which the line conductors 11, 12 are held. The holding device 20 has a circular cross-section, as seen in a vertical direction Z.

The first axial direction X1 thus extends at a right angle with respect to the second axial direction X2. The vertical direction Z extends at right angles to the axial directions X1, X2 of the two line conductors 11, 12.

The system for transmitting electrical power includes one or more energy sources, which are electrically connected to the line conductors 11, 12. The energy sources each have a power source, each of which provides a medium-frequency alternating current with a base frequency of, for example, 25 kHz or 50 kHz. An amperage of the alternating current is, for example, 60 A or 90 A. The electrical energy supplied by the energy sources is transmitted to one or more consumers. For example, the system is used for contactless power transmission to mobile consumers.

It is possible that each of the line conductors 11, 12 is connected to a separate energy source, and that the individual line conductors 11, 12 are electrically isolated from one another. It is also possible that the first line conductors 11 are connected to the same energy source, and represent, for example, a feed conductor and a return conductor. In this case, the first line conductors 11 are electrically connected to one another. It is also possible that the first line conductors 11 are a single conductor, which is arranged in the form of a loop. It is also possible that the second line conductor 12 is electrically connected to the first line conductors 11, or that the line conductors 11, 12 are a single conductor which is arranged in the form of one or more loops.

Figure 2:
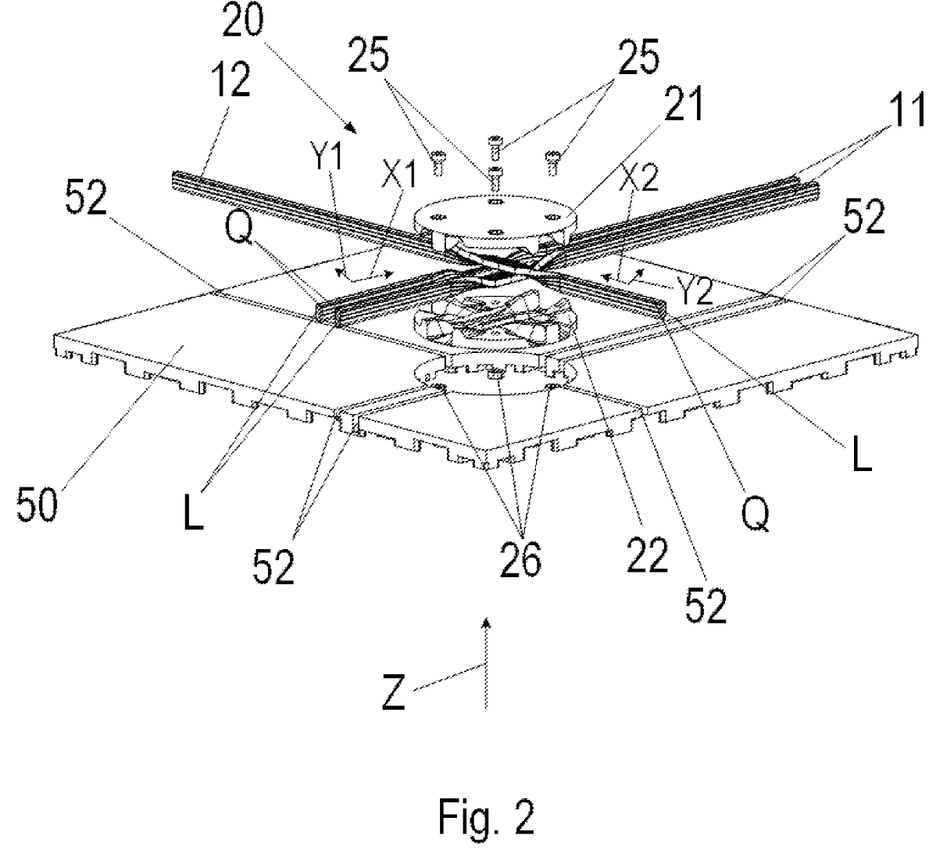
FIG. 2 is an exploded view of the part of the system for transmitting electrical energy illustrated in FIG. 1.

FIG. 2 is an exploded view of the part of the system for transmitting electrical energy illustrated in FIG. 1. The laying plate 50 has a plurality of cut-outs 52 into which the line conductors 11, 12 are arranged. It is also possible that the cut-outs 52 are milled into a floor, and the line conductors 11, 12 are thus arranged in the floor, e.g., directly under a surface of the floor. In this case, the system for transmitting electrical energy does not require laying plates 50.

A hole with a circular cross-section is made in the laying plate 50, into which the holding device 20 is inserted. It is also possible that the hole is made in the floor. The cut-outs 52 are directly connected to the hole. The first line conductors 11 and the second line conductor 12 intersect in a central region of the holding device 20.

The line conductors 11, 12 each include a plurality, in this example three, of cores made of electrically conductive material, e.g., copper. The cores are surrounded by an insulation material. The line conductors 11, 12 have an approximately rectangular cross-section as seen in their respective axial direction X1, X2. The long sides L of the cross-section are longer than the broad sides Q of the cross-section. In the present example, the long sides L are approximately three times as long as the broad sides Q.

The first line conductors 11 are arranged outside the holding device 20 such that the long sides L of the cross-sections of the first line conductors 11 are oriented parallel to the vertical direction Z and at a right angle with respect to a first transverse direction Y1. The first transverse direction Y1 extends at a right angle with respect to the first axial direction X1 of the first line conductor 11 and at a right angle with respect to the vertical direction Z.

The first line conductors 11 are arranged in a region between an edge region of the holding device 20 and the central region of the holding device 20 such that the long sides L of the cross-sections of the first line conductors 11 are oriented inclined to the vertical direction Z and inclined to the first transverse direction Y1.

The first line conductors 11 are arranged in the central region of the holding device 20 such that the long sides L of the cross-sections of the first line conductors 11 are oriented at a right angle with respect to the vertical direction Z and parallel to the first transverse direction Y1.

The second line conductor 12 is arranged outside the holding device 20 such that the long sides L of the cross-section of the second line conductors 12 are oriented parallel to the vertical direction Z and at a right angle with respect to a second transverse direction Y2. The second transverse direction Y2 extends at a right angle with respect to the second axial direction X2 of the second line conductor 12 and at a right angle with respect to the vertical direction Z.

The second line conductor 12 is arranged in a region between an edge region of the holding device 20 and the central region of the holding device 20 such that the long sides L of the cross-section of the second line conductor 11 are oriented inclined to the vertical direction Z and inclined to the second transverse direction Y2.

The second line conductor 12 is arranged in the central region of the holding device 20 such that the long sides L of the cross-sections of the second line conductor 12 are oriented at a right angle with respect to the vertical direction Z and parallel to the second transverse direction Y2.

The holding device 20 has an upper part 21 and a lower part 22. The upper part 21 and the lower part 22 are offset from one another in the vertical direction Z. The line conductors 11, 12 are held in a form-fitting manner between the upper part 21 and the lower part 21. The upper part 21 and the lower part 22 are configured identically.

The upper part 21 and the lower part 22 are made of electrically insulating material, e.g., plastic. The upper part 21 and the lower part 22 are detachably connected to one another by a plurality of screws 25 and nuts 26, each of which is made of electrically insulating material, e.g., plastic. The upper part 21 and the lower part 22 each have recesses for accommodating the screw heads of the screws 25 and the nuts 26.

Figure 3:
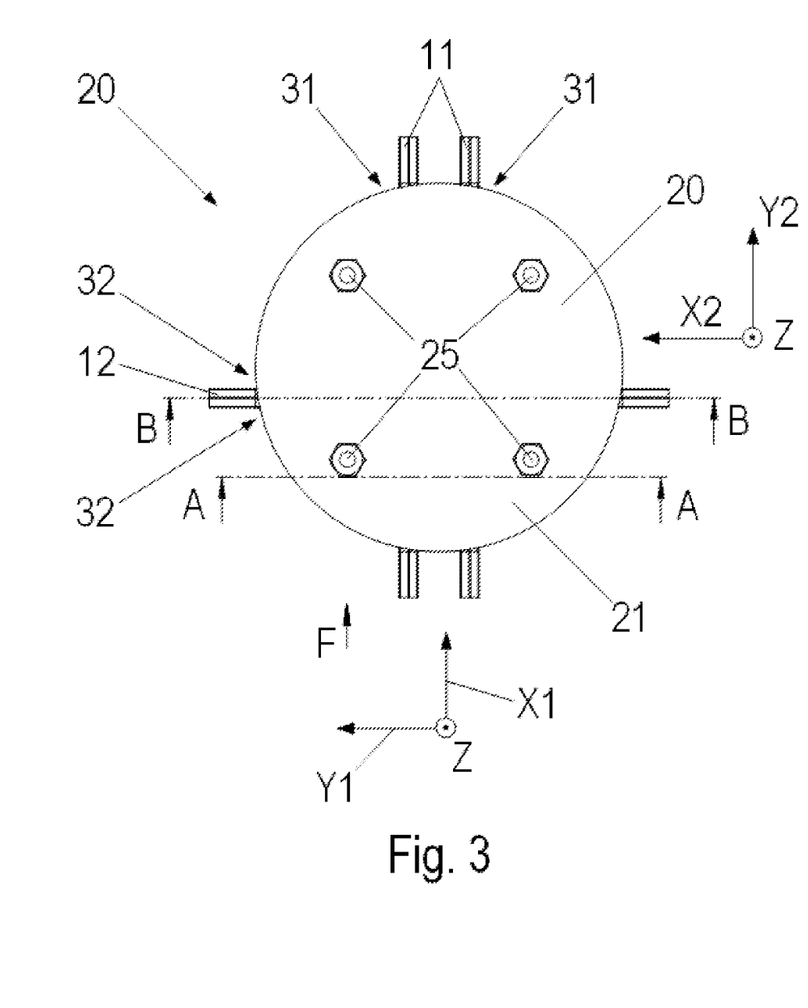
FIG. 3 is an enlarged view of the holding device illustrated in FIG. 1.

FIG. 3 is an enlarged view of the holding device 20 illustrated in FIG. 1. The holding device 20 has two first channels 31 for accommodating respectively one first line conductor 11. The holding device 20 also has two second channels 32 for accommodating respectively one second line conductor 12. The channels 31, 32 are formed between the upper part 21 and the lower part 22 of the holding device 20. As illustrated, the channels 31, 32 are covered by the upper part 21 of the holding device 20.

The first channels 31 extend along the first axial direction X1 from an edge region of the holding device 20 through the central region of the holding device 20 to an approximately opposite edge region of the holding device 20. The second channels 32 extend along the second axial direction X2 from an edge region of the holding device 20 through the central region of the holding device 20 to an approximately opposite edge region of the holding device 20. The first channels 31 extend at a right angle with respect to the second channels 32.

A viewing direction F extends in the first axial direction X1. A first sectional line A-A extends at a right angle with respect to the first axial direction X1 and outside the second channels 32. A second sectional line B-B extends at a right angle with respect to the first axial direction X1 and through one of the second channels 32.

Figure 4:
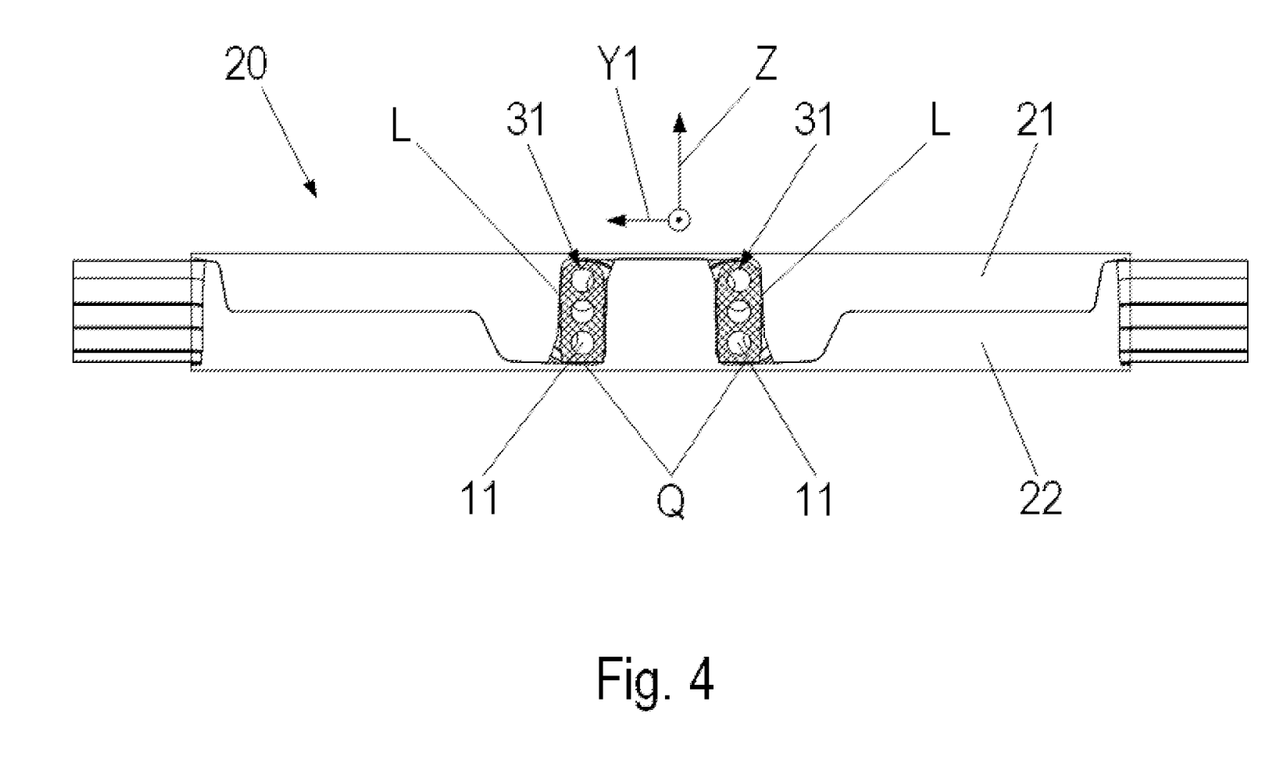
FIG. 4 is a front view of the holding device illustrated in FIG. 3 in the direction of view F.

FIG. 4 is a front view of the holding device 20 illustrated FIG. 3 in the direction of view F. The first channels 31 each have an at least approximately rectangular cross-section. The long sides L of the cross-section of the first channels 31 are longer than the broad sides Q of the cross-section of the first channels 31. In each of the first channels 31, respectively one first line conductor 11 is accommodated. The long sides L of the cross-sections of the first channels 31 correspond approximately to the long sides L of the cross-sections of the first line conductors 11. The broad sides Q of the cross-sections of the first channels 31 correspond approximately to the broad sides Q of the cross-sections of the first line conductors 11. In the edge region of the holding device 20, the long sides L of the cross-sections of the first channels 31 are oriented parallel to the vertical direction Z and at a right angle with respect to the first transverse direction Y1.

Figure 5:
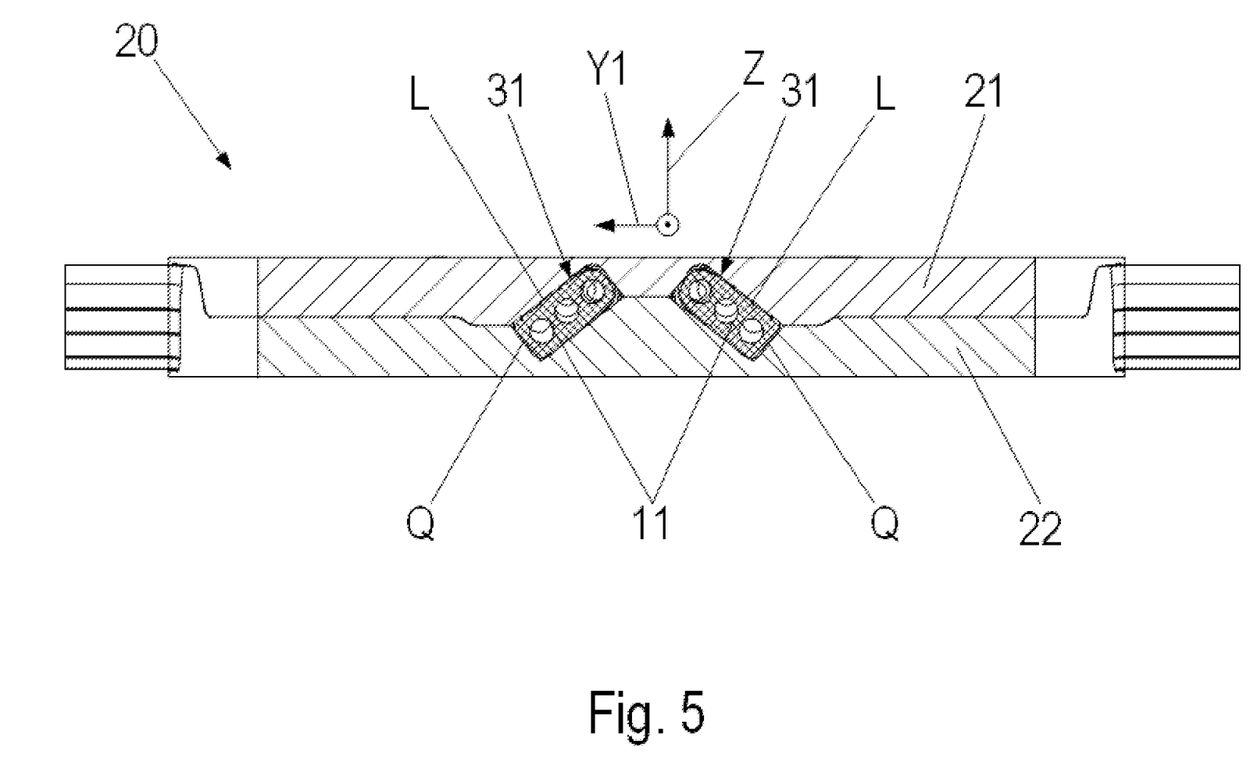
FIG. 5 is a cross-sectional view of the holding device illustrated in FIG. 3 along a first sectional line A-A.

FIG. 5 is a cross-sectional view of the holding device 20 illustrated in FIG. 3 along a first sectional line A-A. In this region, which lies between the edge region of the holding device 20 and the central region of the holding device 20, the long sides L of the cross-sections of the first channels 31 are oriented inclined to the vertical direction Z and inclined to the first transverse direction Y1. The first channels 31 have undergone a rotation of approximately 45° about the first axial direction X1 relative to their orientation in the edge region. Similarly, the first line conductors 11 have undergone a rotation of approximately 45° about the first axial direction X1 relative to their orientation in the edge region.

Figure 6:
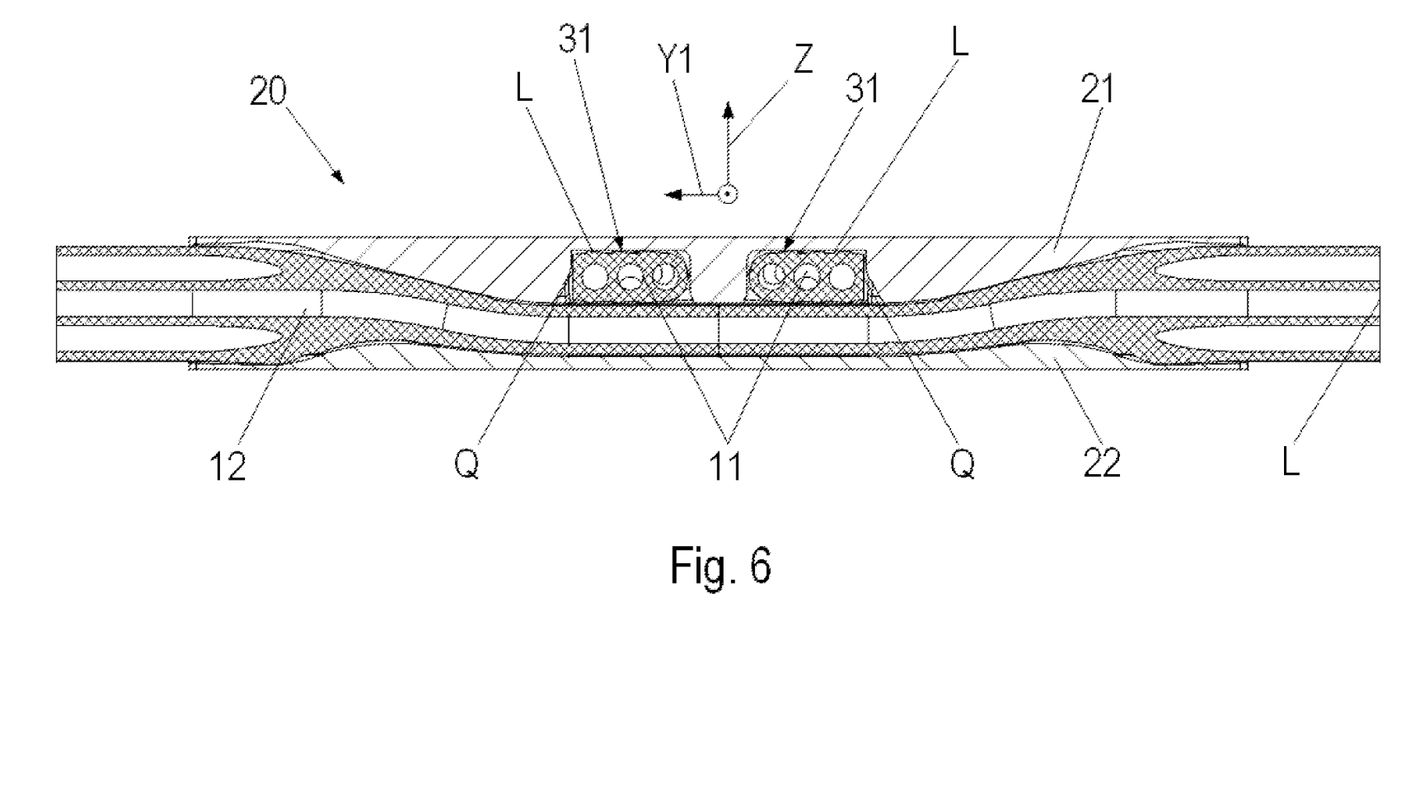
FIG. 6 is a cross-sectional view of the holding device illustrated in FIG. 3 along a second sectional line B-B.

FIG. 6 is a cross-sectional view of the holding device 20 illustrated in FIG. 3 along a second sectional line B-B. In the central region of the holding device 20, the long sides L of the cross-sections of the first channels 31 are oriented at a right angle with respect to the vertical direction Z and parallel to the first transverse direction Y1. The first channels 31 have undergone a rotation of approximately 90° about the first axial direction X1 relative to their orientation in the edge region. Similarly, the first line conductors 11 have undergone a rotation of approximately 90° about the first axial direction X1 relative to their orientation in the edge region.

The second channels 32 each have an at least approximately rectangular cross-section. The long sides L of the cross-section of the second channels 32 are longer than the broad sides Q of the cross-section of the second channels 32. The long sides L of the cross-sections of the second channels 32 correspond approximately to the long sides L of the cross-sections of the second line conductor 12. The broad sides Q of the cross-sections of the second channels 32 correspond approximately to the broad sides Q of the cross-sections of the second line conductor 12.

In the edge regions of the holding device 20, the long sides L of the cross-sections of the second channels 32 are oriented parallel to the vertical direction Z and at a right angle with respect to the second transverse direction Y2.

In a region which is located between the edge region of the holding device 20 and the central region of the holding device 20, the long sides L of the cross-sections of the second channels 31 are oriented inclined to the vertical direction Z and inclined to the second transverse direction Y2. The second channels 32 have undergone a rotation of approximately 45° about the second axial direction X2 relative to their orientation in the edge region. Similarly, the second line conductor 12 has undergone a rotation of approximately 45° about the second axial direction X2 relative to its orientation in the edge region.

In the central region of the holding device 20, the long sides L of the cross-sections of the second channels 32 are oriented at a right angle with respect to the vertical direction Z and parallel to the second transverse direction Y2. The second channels 32 have undergone a rotation of approximately 90° about the second axial direction X2 relative to their orientation in the edge region. Similarly, the second line conductor 12 has undergone a rotation of approximately 90° about the second axial direction X2 relative to its orientation in the edge region.

In the central region of the holding device 20, the first channels 31 and the second channels 32 extend offset from one another in the vertical direction Z. The first line conductors 11 extend offset from the second line conductor 12 in the vertical direction Z. The first line conductors 11 are tightly adjacent to the second line conductor 12. A common extension of the line conductors 11, 12 in the vertical direction Z in the central region thus corresponds to twice the broad side Q of the line conductors 11, 12. An extension of the individual line conductors 11, 12 in the edge regions of the holding device 20 in the vertical direction Z corresponds to the long side L of the line conductors 11, 12. As mentioned above, the long sides L are approximately three times as long as the broad sides Q. The joint extension of the line conductors 11, 12 in the vertical direction Z in the central region is thus less than the extension of the line conductors 11, 12 in the vertical direction Z in the edge regions.

LIST OF REFERENCE CHARACTERS

11 First line conductor
12 Second line conductor
15 Intersection region
20 Holding device
21 Upper part
22 Lower part
25 Screw
26 Nut
31 First channel
31 Second channel
50 Laying plate
51 Detent
52 Cut-out
A First sectional line
B Second sectional line
F Direction of view
L Long side
Q Broad side
X1 First axial direction
X2 Second axial direction
Y1 First transverse direction
Y2 Second transverse direction
Z Vertical direction

The invention claimed is:

1. A system for transmitting electrical energy from an energy source to a consumer, comprising:
   a first line conductor;
   a second line conductor; and
   a holding device arranged at an intersection region of the first line conductor and the second line conductor;
   wherein each line conductor has, in a respective axial direction, a rectangular cross-section, long sides of the cross-sections being longer than broad sides of the cross-sections, the axial directions of the line conductors extending at a right angle to a vertical direction;
   wherein the long sides of the cross-sections arranged outside the intersection region are oriented parallel to the vertical direction; and
   wherein the long sides of the cross-sections arranged in a central region of the holding device are oriented at a right angle with respect to the vertical direction.

2. The system according to claim 1, wherein the system is adapted to contactlessly transmit energy to a mobile consumer.

3. The system according to claim 1, wherein the long sides of the cross-sections arranged in a region between an edge region of the holding device and the central region of the holding device are oriented inclined to the vertical direction and inclined to a respective transverse direction.

4. The system according to claim 1, wherein the holding device includes an upper part and a lower part arranged offset from one another in the vertical direction, and the line conductors being held between the upper part and the lower part in a form-fitting manner.

5. The system according to claim 4, wherein the upper part and the lower part are identical.

6. The system according to claim 4, wherein the upper part and the lower part are formed of an electrically insulating material and/or plastic.

7. The system according to claim 4, wherein the upper part and the lower part are detachably connected to one another by at least one screw formed of an electrically insulating material and/or plastic.

8. The system according to claim 1, wherein the holding device has a circular cross-section with respect to the vertical direction.

9. The system according to claim 1, wherein the holding device includes a first channel accommodating the first line conductor and a second channel accommodating the second line conductor, the channels each extending from an edge region of the holding device through the central region of the holding device to a respective opposite edge region of the holding device.

10. The system according to claim 9, wherein the first channel extends at a right angle with respect to the second channel.

11. The system according to claim 9, wherein the channels have a rectangular cross-section, long sides of the cross-sections of the channels being longer than broad sides of the cross-sections of the channels, in the edge region of the holding device, the long sides of the cross-sections of the channels are oriented parallel to the vertical direction, in the central region of the holding device, the long sides of the cross-sections of the channels are oriented at a right angle with respect to the vertical direction.

12. The system according to claim 9, wherein the long sides of the cross-sections of the channels, in a region between the edge region of the holding device and the central region of the holding device, are oriented inclined to the vertical direction and inclined to a respective transverse direction.

13. The system according to claim 9, wherein, in the central region of the holding device, the first channel and the second channel extend offset from one another in the vertical direction.

14. The system according to claim 9, wherein the holding device includes two first channels accommodating two first line conductors extending in parallel and/or two second channels accommodating two second line conductors extending in parallel.

15. A system for transmitting electrical energy from an energy source to a consumer, comprising:
a first line conductor;
a second line conductor; and
a holding device arranged at an intersection region of the first line conductor and the second line conductor;
wherein each line conductor has, in a respective axial direction, an at least approximately rectangular cross-section, long sides of the cross-sections being longer than broad sides of the cross-sections, the axial directions of the line conductors extending at a right angle to a first direction;
wherein the long sides of the cross-sections arranged outside the intersection region are oriented parallel to the first direction; and
wherein the long sides of the cross-sections arranged in a central region of the holding device are oriented at a right angle with respect to the first direction.

16. A system for transmitting electrical energy from an energy source to a consumer, comprising:
a first line conductor;
a second line conductor; and
a holding device adapted to be arranged at an intersection region of the first line conductor and the second line conductor;
wherein each line conductor has, in a respective axial direction, a rectangular cross-section, long sides of the cross-sections being longer than broad sides of the cross-sections, the axial directions of the line conductors adapted to extend at a right angle to a vertical direction;
wherein the long sides of the cross-sections adapted to be arranged outside the intersection region are adapted to be oriented parallel to the vertical direction; and
wherein the long sides of the cross-sections adapted to be arranged in a central region of the holding device are adapted to be oriented at a right angle with respect to the vertical direction.

\* \* \* \* \*